United States Patent [19]

Wang

[11] Patent Number: 5,112,893
[45] Date of Patent: May 12, 1992

[54] TRIS-(2-ALKYL-4-ALKOXYPHENYL) PHOSPHITES AS PROCESSING STABILIZERS FOR POLYOLEFINS

[75] Inventor: Richard H. S. Wang, Kingsport, Tenn.

[73] Assignee: Eastman Kodak Company, Rochester, N.Y.

[21] Appl. No.: 596,655

[22] Filed: Oct. 10, 1990

[51] Int. Cl.$^5$ ............................................. C08K 5/526
[52] U.S. Cl. ................................... 524/150; 524/151
[58] Field of Search ................................ 524/150, 151

[56] References Cited

U.S. PATENT DOCUMENTS

| | | | |
|---|---|---|---|
| 3,558,554 | 1/1971 | Kuriyama et al. | 524/151 |
| 3,567,683 | 3/1971 | Spacht | 524/150 |
| 4,282,141 | 8/1981 | Minagawa et al. | 524/151 |
| 4,384,062 | 5/1983 | Batorewicz | 524/151 |

FOREIGN PATENT DOCUMENTS 59-27936 2/1984 Japan .

1007817 10/1965 United Kingdom ................ 524/150

*Primary Examiner*—Kriellion S. Morgan
*Attorney, Agent, or Firm*—J. Frederick Thomsen; William P. Heath, Jr.

[57] ABSTRACT

Disclosed are polyolefin compositions containing a phosphite compound having the formula

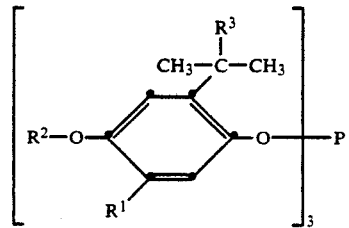

wherein $R^1$ is hydrogen, alkyl or aralkyl; $R^2$ is hydrogen or alkyl; and $R^3$ is alkyl or aryl.

3 Claims, No Drawings

TRIS-(2-ALKYL-4-ALKOXYPHENYL) PHOSPHITES AS PROCESSING STABILIZERS FOR POLYOLEFINS

This invention concerns pertains to the use of certain tris-(2-alkyl-4-alkoxyphenyl) phosphites as processing stabilizers for polyolefins. This invention also pertains to a method of inhibiting thermally-induced, oxidative degradation of polyolefins by the addition thereto of at least one of the tris-phosphite compounds.

Synthetic polymeric materials such as polyolefins, particularly polypropylene, require stabilization against thermal degradation to prevent significant changes in the properties of the polymeric material during melt processing. Thus, a stabilizer normally is added to polyolefins shortly after they are manufactured. For example, without adequate stabilization, the melt-flow rate of polypropylene changes significantly during its extrusion in the compounding of various formulations and products. Various cyclic phosphites (and the use thereof in polyolefins) are well-known. See, for example, U.S. Pat. Nos. 3,441,633, 3,467,733, 3,592,858 and 3,714,302 and French Patent 1,501,427. Many of these known cyclic phosphite compounds possess moderate to poor storage stability which imparts poor handling properties and causes their effectiveness as polyolefin stabilizers to diminish when they are stored over a period of time, especially in areas of high humidity. The phosphites employed in accordance with the present invention exhibit excellent storage stability and are effective process stabilizers for polyolefins.

The stabilized compositions of the present invention comprise a poly-α-olefin susceptible to degradation upon exposure to heat and/or radiation containing a stabilizing amount of a compound having the formula

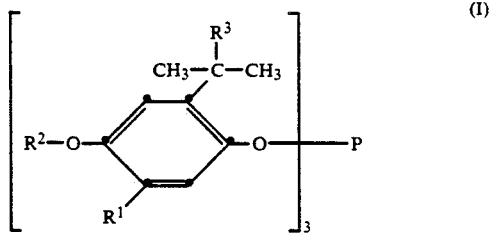

(I)

wherein
$R^1$ is hydrogen, alkyl or aralkyl;
$R^2$ is hydrogen or alkyl; and
$R^3$ is alkyl or aryl.
Examples of the alkyl groups represented by $R^1$, $R^2$ and $R^3$ include alkyl containing up to about 8 carbon such as methyl, ethyl, propyl, 2-propyl, butyl, 2-butyl, 2-methyl-2-propyl, pentyl, 2-pentyl, hexyl, 2-ethyl-hexyl, 2,4,4-trimethyl-2-pentyl. The alkyl groups represented by $R^1$, $R^2$ and $R^3$ preferably contain up to 4 carbon atoms. The aryl group represented by $R^3$ and the aryl moiety of the aralkyl radical represented by $R^1$ may be unsubstituted phenyl or phenyl substituted with 1 or 2 groups selected from lower, i.e., containing up to about 4 carbon atoms, alkyl, lower alkoxy or halogen, e.g., chlorine or bromine. The alkyl moiety of the aralkyl groups typically is lower alkyl. The aryl group represented by $R^3$ and the aryl moiety of the aralkyl radical represented by $R^1$ preferably are unsubstituted phenyl.

The compounds of formula (I) may be prepared by reacting phosphorus trichloride with an alkylated hydroquinone or mono-alkyl ether of an alkylated hydroquinone compound having the formula

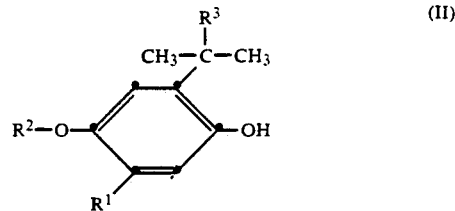

(II)

according to known procedures, wherein $R^1$, $R^2$ and $R^3$ are defined above. Examples of the compounds of formula (II) are 2-(1,1-dimethylethyl)-4-methoxyphenol, 4-butoxy-2-(1,1-dimethylpropyl)phenol, 2-(α,α-dimethylbenzyl)-4-ethoxyphenol, and the like.

The stabilized composition of my invention preferably contain a stabilizing amount of a phosphite compound having the formula

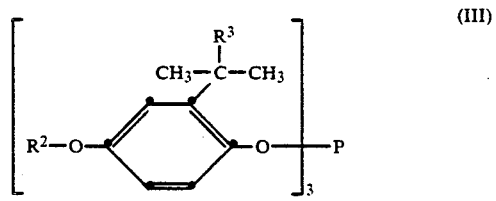

(III)

wherein $R^2$ and $R^3$ each is methyl or ethyl.

The preparation of the tris-phosphite compounds is further illustrated by the following example.

EXAMPLE 1

Phosphorus trichloride (22.9 g, 0.167 mole) is added dropwise over a period of 20 minutes to a solution of 2-(1,1-dimethylethyl)-4-methoxyphenol (90 g, 0.5 mole), pyridine (0.5 g) and xylene (17 g) at 50° C. The reaction mixture is heated at 50° C. for 1 hour and then is heated to and held at 130 © for 2 hours. After distilling off some low boiling material under reduced pressure, the reaction mixture is cooled to 90° C., 200 mL 2-propanol are added and the resulting mixture is cooled 15° C. The product is collected by filtration, washed with cold 2-propanol and dried. The product, tris-[2-(1,1-dimethylethyl)-4-methoxyphenyl] phosphite is obtained in a yield of 58% and has a melting temperature of 82°-86° C.

The tris-phosphite compounds of formula (I) may be used in a wide variety of polyolefin materials which are susceptible to degradation upon exposure to heat and/or radiation including both visible and ultraviolet light. Examples of such materials include homo- and co-polymers of α-olefins such as polyethylene, polypropylene, polybutene, poly-3-methylbutene and ethylene-propylene copolymers and ethylene-vinyl acetate copolymers. The preferred stabilized compositions of my invention comprise homo- and co-polymers of α-olefins of 2 to 4 carbon atoms, especially polypropylene, containing a stabilizing amount of one or more of the compounds of formula (I).

The concentration of the phosphite compound in the polymeric material which will effectively inhibit polymer degradation can vary considerably depending on the particular polymer being stabilized and the end use for which the stabilized polymeric material is designed.

Generally, concentration in the range of 0.001 to 5.0 weight percent may be used with concentrations of about 0.01 to 0.5 being most common.

The phosphite stabilizer may be incorporated into the polymeric materials by conventional blending techniques. For example, the stabilizer may be added directly to a melt of the polymer on a roll mill to distribute the phosphite compound uniformly throughout the polymer. Alternatively, the phosphite compound may be dry-blended with a finely-divided form of the polymer such as pellets and then the dry mix can be mixed further in and extruded from an extruder.

Phosphites function as processing stabilizers in polyolefins by decomposing hydroperoxides which initiate the thermal degradation of polyolefins. However, when phosphites are hydrolyzed by water, their hydroperoxide decomposing capability is reduced drastically. Therefore, the hydrolytic stability of tris-[2-(1,1-dimethylethyl)-4-methoxyphenyl] phosphite (Compound A) was compared to the hydrolytic stability of tris-[2,4-bis(1,1-dimethylethyl)phenyl] phosphite (Compound B), tris(4-nonylphenyl) phospite (Compound C; Naugard PHR) and 2-[2-(1,1-dimethylethyl)-4-methoxyphenoxy)-5,5-dimethyl-1,3,2-dioxaphosphorinane (Compound D) disclosed in U.S. Pat. No. 4,882,374. In this evaluation, a mixture of one of the phosphite compounds (0.001 mole) and water (0.002 mole) was tumble-mixed for 1 day. The water-phosphite mixture then was added to a mixture of tertiary butyl hydroperoxide (0.001 mole; TBHP) in 5 mL of toluene and the resulting mixture was shaken for 100 minutes. Samples of the mixture were taken after (1) 30 minutes and (2) 100 minutes of shaking and were analyzed by gas chromatography for tertiary butyl alcohol (TBA) and tertiary butyl hydroperoxide (TBHP) to determine the amount of tertiary butyl hydroperoxide converted to tertiary butyl alcohol which establishes the effectiveness of each phosphite compound to decompose hydroperoxides. As a control, the same test was performed on each phosphite compound except the 1-day exposure to water was omitted.

The results of the above described evaluations are set forth in Table I wherein the percent TBHP converted to TBA is determined by the gas chromatography area percent for TBHP and TBA according to the formula:

$$\frac{\text{Area \% TBA}}{\text{Area \% TBA + Area \% TBHP}} \times 100$$

TABLE I

| Phosphite Compound | Percent TBHP Converted to TBA Time of Sampling (minutes) | |
|---|---|---|
| | 30 | 100 |
| A - Control | 34 | 65 |
| A - Water treated | 34 | 55 |
| B - Control | 40 | 65 |
| B - Water treated | 40 | 65 |
| C - Control | 56 | 70 |
| C - Water treated | 8 | 10 |
| D - Control | 65 | 78 |
| D - Water treated | 8 | 12 |

The effectiveness of Compounds A as a processing stabilizer was determined and compared to Compound B. Samples of polypropylene containing 0.05 phr (parts by weight per 100 parts by weight polypropylene) calcium stearate, 0.05 phr 2,2-bis[[3-[3,5-bis(1,1-dimethylethyl)-4-hydroxyphenyl]-1-oxopropoxy]methyl]-1,3-propanediyl 3,5-bis(1,1-dimethylethyl)-4-hydroxybenzenepropanoate (Irganox 1010 stabilizer) and 0.05 phr of phosphite compound A or B were prepared by shaking the additives and polypropylene pellets together in a plastic bag and then blending the dry mix in and extruding each sample from a Brabender single screw rod extruder at 260° C. The control sample contained no phosphite compound. Each polypropylene sample was extruded five times. After each extrusion, the melt-flow rate (ASTM Method D 1238, Procedure A, Condition E; g/10 minutes) is determined for each sample.

The inhibiting effect of each phosphite compound on the thermal degradation of the polypropylene is shown in Table II wherein the melt flow rates of the polypropylene samples prepared and extruded as described above are set forth.

TABLE II

| Extruded Sample | Polypropylene Sample Containing Compound | | |
|---|---|---|---|
| | Control | A | B |
| First Extrusion | 5.98 | 4.20 | 4.51 |
| Second Extrusion | 8.96 | 5.99 | 6.15 |
| Third Extrusion | 12.70 | 7.48 | 8.67 |
| Fourth Extrusion | 17.18 | 8.34 | 10.83 |
| Fifth Extrusion | 19.09 | 8.86 | 12.68 |

The invention has been described in detail with particular reference to preferred embodiments thereof, but it will be understood that variations and modifications will be effected within the spirit and scope of the invention.

I claim:

1. A stabilized composition comprising a poly-α-olefin susceptible to degradation upon exposure to heat and/or radiation containing a stabilizing amount of a compound having the formula

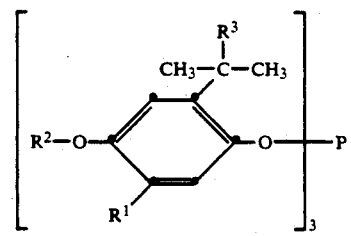

wherein
$R^1$ is hydrogen, alkyl or aralkyl;
$R^2$ is alkyl; and
$R^3$ is alkyl or aryl.

2. A stabilized composition according to claim 1 wherein the polyolefin is a polymer of an α-olefin having 2 to 4 carbon atoms and wherein
$R^1$ is hydrogen;
$R^2$ is alkyl of 1 to 4 carbon atoms; and
$R^3$ is alkyl of 1 to 4 carbon atoms or phenyl.

3. A stabilized composition according to claim 1 comprising polypropylene susceptible to degradation upon exposure to heat and/or radiation containing a stabilizing amount of a compound having the formula

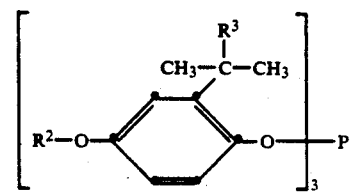

wherein $R^2$ and $R^3$ are methyl or ethyl.

* * * * *